(12) United States Patent
Verbeure

(10) Patent No.: US 10,726,797 B2
(45) Date of Patent: Jul. 28, 2020

(54) TECHNIQUES FOR UPDATING LIGHT-EMITTING DIODES IN SYNCHRONY WITH LIQUID-CRYSTAL DISPLAY PIXEL REFRESH

(71) Applicant: NVIDIA CORPORATION, Santa Clara, CA (US)

(72) Inventor: Tom J. Verbeure, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/271,744

(22) Filed: Feb. 8, 2019

(65) Prior Publication Data

US 2019/0266963 A1 Aug. 29, 2019

Related U.S. Application Data

(60) Provisional application No. 62/636,124, filed on Feb. 27, 2018.

(51) Int. Cl.
*G09G 3/34* (2006.01)
*G09G 3/36* (2006.01)
*G06F 13/10* (2006.01)
*G06F 13/42* (2006.01)
*G09G 3/20* (2006.01)

(52) U.S. Cl.
CPC .......... *G09G 3/3426* (2013.01); *G06F 13/10* (2013.01); *G06F 13/4282* (2013.01); *G09G 3/2096* (2013.01); *G09G 3/36* (2013.01); *G06F 2213/0002* (2013.01); *G09G 2320/0626* (2013.01)

(58) Field of Classification Search
CPC ...... G09G 3/3426; G09G 3/2096; G09G 3/36; G06F 13/10; G06F 13/4282
See application file for complete search history.

(56) References Cited

U.S. PATENT DOCUMENTS

| 5,931,960 | A | 8/1999 | Kletter |
| 6,359,662 | B1 | 3/2002 | Walker |
| 7,843,402 | B2 | 11/2010 | Nakadaira |
| 8,059,070 | B2 | 11/2011 | Odawara |
| 2002/0019970 | A1* | 2/2002 | Araki ............... G06F 30/398 716/112 |

(Continued)

OTHER PUBLICATIONS

Non-Final Office Action received for U.S. Appl. No. 16/163,516 dated Nov. 19, 2019, 22 pages.

(Continued)

*Primary Examiner* — Ariel A Balaoing
(74) *Attorney, Agent, or Firm* — Artegis Law Group, LLP

(57) ABSTRACT

A display controller within a display device includes a serial peripheral interface (SPI) that coordinates the updating of current settings for groups of light-emitting diodes (LEDs). The SPI controller operates in synchrony with a liquid-crystal display (LCD) vertical scan position in order to update the current settings for rows of LEDs in parallel with the updating of nearby rows of LCD pixels. When updating a row of LEDs, the SPI controller executes one or more SPI transactions included in an SPI program to write current settings for multiple LEDs nearly simultaneously. A compiler generates the SPI program based on the topology of LEDs included in the display device.

20 Claims, 9 Drawing Sheets

(56) References Cited

U.S. PATENT DOCUMENTS

| | | |
|---|---|---|
| 2006/0077489 A1 | 4/2006 | Zhang et al. |
| 2006/0107616 A1* | 5/2006 | Ratti ............... E04B 1/00 52/750 |
| 2006/0279522 A1* | 12/2006 | Kurihara ........... G09G 3/3413 345/102 |
| 2007/0211014 A1* | 9/2007 | Kim .................. G09G 3/3406 345/102 |
| 2010/0171690 A1 | 7/2010 | Park et al. |
| 2010/0225574 A1 | 9/2010 | Fujiwara |
| 2010/0315445 A1* | 12/2010 | An ................... G09G 3/3406 345/690 |
| 2011/0050760 A1 | 3/2011 | Ito |
| 2011/0069095 A1* | 3/2011 | Kim .................. G09G 3/342 345/690 |
| 2011/0122170 A1 | 5/2011 | Kim et al. |
| 2011/0141077 A1 | 6/2011 | Cho |
| 2012/0093430 A1 | 4/2012 | Sumi et al. |
| 2012/0105509 A1 | 5/2012 | Ito |
| 2012/0154459 A1 | 6/2012 | Otoi |
| 2013/0010016 A1 | 1/2013 | Sasaki |
| 2013/0314459 A1 | 11/2013 | Nakanishi |
| 2015/0070403 A1 | 3/2015 | Kim |
| 2016/0225301 A1 | 8/2016 | Scepanovic et al. |
| 2016/0344992 A1 | 11/2016 | D'Alfonso et al. |
| 2017/0132972 A1 | 5/2017 | Tsuchida |
| 2018/0277059 A1 | 9/2018 | Tomabechi |
| 2018/0302651 A1 | 10/2018 | Jacobson et al. |
| 2018/0336397 A1 | 11/2018 | Smith |
| 2019/0107626 A1 | 4/2019 | Marsuura |
| 2019/0188917 A1 | 6/2019 | Cho |
| 2019/0266935 A1 | 8/2019 | Roever |
| 2019/0266959 A1 | 8/2019 | Slavenburg |
| 2019/0266961 A1 | 8/2019 | Slavenburg |

OTHER PUBLICATIONS

Notice of Allowance for U.S. Appl. No. 16/152,358, dated Nov. 20, 2019, 12 pages.

Ex-Parte Quayle Action received for U.S. Appl. No. 16/276,564, dated Mar. 31, 2020, 16 pages.

* cited by examiner

TECHNIQUES FOR UPDATING LIGHT-EMITTING DIODES IN SYNCHRONY WITH LIQUID-CRYSTAL DISPLAY PIXEL REFRESH

CROSS-REFERENCE TO RELATED APPLICATIONS

This application claims the priority benefit of the United States provisional patent application titled, "Flexible SPI Backlight Controller and Compiler," filed on Feb. 27, 2018 and having Ser. No. 62/636,124. The subject matter of this related application is hereby incorporated herein by reference.

BACKGROUND

Field of the Various Embodiments

Embodiments of the present invention relate generally to display devices and display technology and, more specifically, to techniques for updating light-emitting diodes in synchrony with liquid-crystal display pixel refresh.

Description of the Related Art

A matrix backlight liquid-crystal display (LCD) panel usually includes an array of light-emitting diodes (LEDs) coupled to an array of LCD pixels. The array of LEDs is commonly known as the "backlight." In operation, the backlight emits light to the array of LCD pixels. Conventional matrix backlight LCD panels typically include one or more backlight controllers that control the operation of the LEDs. Each backlight controller is wired to a specific set of LEDs according to a particular wiring topology, and the backlight controller controls the specific set of LEDs via that particular wiring topology.

One drawback of the above approach is that different matrix backlight LCD panels can include different numbers of backlight controllers, and the backlight controller(s) associated with a particular type of matrix backlight LCD panel can be wired to relevant set(s) of LEDs according to many different wiring topologies. Consequently, each backlight controller for a given matrix backlight LCD panels needs to be independently configured to control a corresponding set of LEDs based on the wiring topology implemented. Independently configuring the backlight controller(s) included in each given matrix backlight LCD panel is tedious and time consuming.

As the foregoing illustrates, what is needed in the art is a more effective approach for configuring the backlight controller(s) included matrix backlight LCD panels.

SUMMARY

Various embodiments include a computer-implemented method for displaying an image, including determining a first portion of a topology based on a first vertical scan position of the display device, wherein the first portion of the topology includes a first set of wiring configurations and indicates a first set of light sources included in the display device that are related to the first set of wiring configurations, determining a first subset of the wiring configurations based on one or more topological criteria associated with the display device, wherein the first subset of the wiring configurations corresponds to a first subset of the light sources, and generating at least one instruction based on the first subset of the wiring configurations, wherein the display device executes the at least one instruction upon reaching the first vertical scan position to update the first subset of the light sources in order to display at least a portion of the image.

At least one technological advantage of the disclosed techniques relative to the prior art is that a matrix backlight LCD panel can be flexibly programmed independently of wiring topology.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
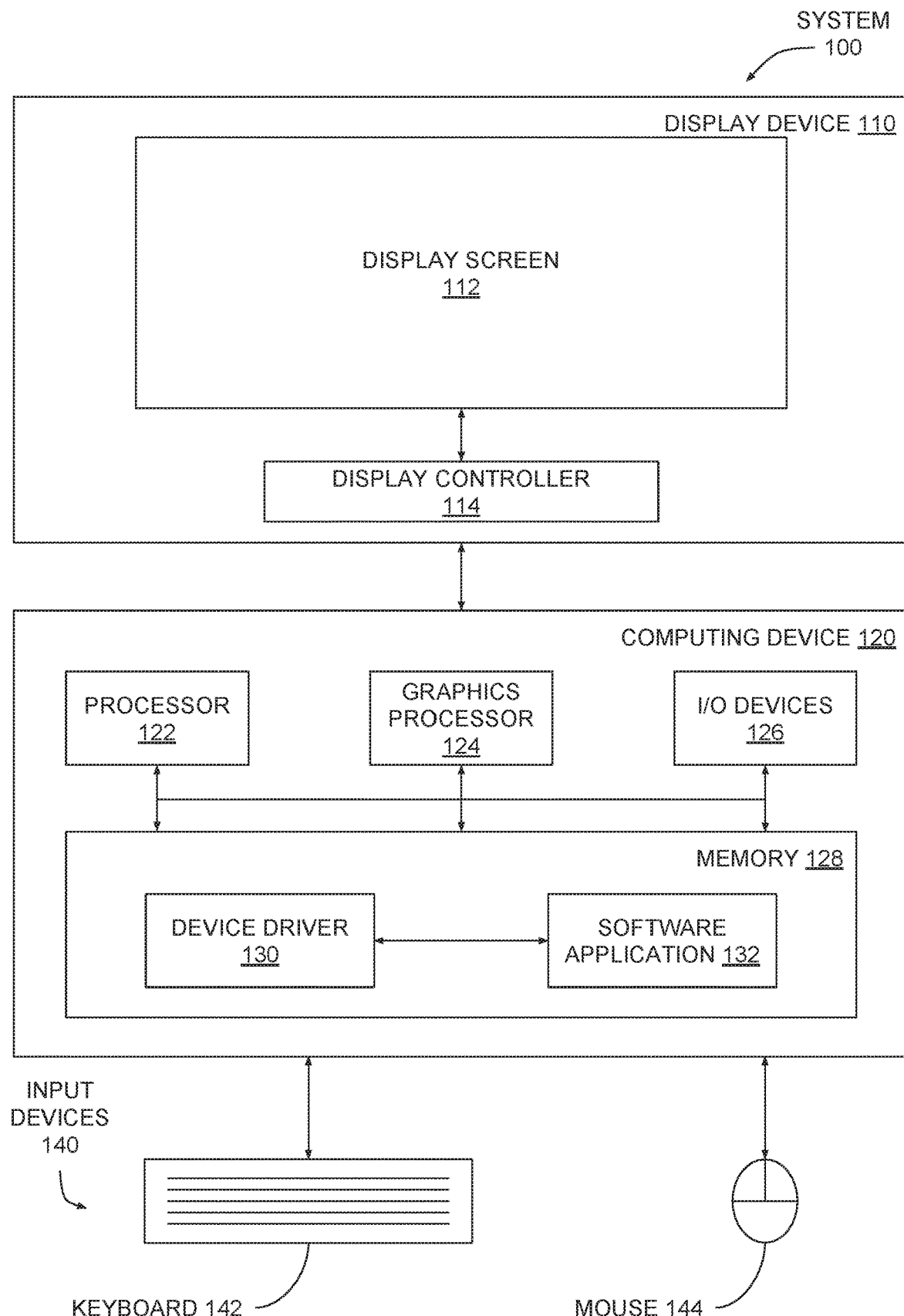
FIG. 1 illustrates a system configured to implement one or more aspects of the present invention.

In the following description, numerous specific details are set forth to provide a more thorough understanding of the various embodiments. However, it will be apparent to one skilled in the art that the inventive concepts may be practiced without one or more of these specific details.

A matrix backlight LCD panel includes a backlight of LEDs that emit light to an array of LCD pixels. One or more backlight controllers control the operation of the LEDs and cause the LEDs to illuminate the LCD pixels. A given backlight controller is wired to a specific set of LEDs according to a particular wiring topology and is configured to control that specific set of LEDs based on that particular wiring topology. However, backlight controllers in different matrix backlight LCD panels can be wired to different sets of LEDs according to many different wiring topologies. Consequently, backlight controllers in different matrix backlight LCD panels usually have to be independently configured to control the corresponding LEDs based on those different wiring topologies.

To address these issues, a display controller within a display device includes a serial peripheral interface (SPI) that coordinates the updating of current settings for groups of LEDs in a flexible and programmable manner. The SPI controller operates in synchrony with the LCD vertical scan position in order to update the current settings for rows of LEDs in parallel with the updating of nearby rows of LCD pixels. When updating a row of LEDs, the SPI controller executes one or more SPI transactions included in an SPI program to write current settings for multiple LEDs nearly simultaneously.

The SPI program is generated based on a spreadsheet that defines the topology of LEDs included in the display device. Specifically, for each LED, the spreadsheet indicates an SPI number, a driver chip number, and an LED number. The spreadsheet is generated when configuring a specific type of display device. A compiler compiles the spreadsheet to generate the SPI program. In doing so, the compiler implements a greedy algorithm to sort LEDs based on SPI number, driver chip number and LED number and then group together continuous sequences of LEDs. The current values for these continuous sequences of LEDs can be updated nearly simultaneously in the manner described above. For each continuous sequence of LEDs, the compiler generates an SPI transaction to be included in the SPI program.

At least one technological advantage of the disclosed techniques is that LED current settings can be updated rapidly across an entire row of LEDs in synchrony with LCD vertical scan position during a screen refresh. Accordingly, the updating of LED current settings need not be delayed until LCD vertical scan reaches the bottom of the display screen, eliminating the lag found in conventional systems. In particular, the SPI program can execute synchronously with the updating of LCD lines via wait instructions that wait for a specific line. This approach allows the updating of the LED values to remain in-sync with the updating of LCD pixels, thereby avoiding lag and image quality issues that might otherwise occur. In other words, rows of LEDs are updated in parallel with rows of LCDs, thereby reducing or eliminating certain visual artifacts found in conventional display devices when LEDs and LCD pixels are updated separately. The disclosed techniques thus represent multiple technological advantages over prior art techniques.

System Overview

FIG. 1 illustrates a system configured to implement one or more aspects of the present invention. As shown, system 100 includes a display device 110 coupled to a computing device 120. Computing device 120 is coupled to input devices 140 that include a keyboard 142 and a mouse 144. Display device 110 includes a display screen 112 and a display controller 114. In one embodiment, display device 110 is an LCD with an LED backlight configured for high dynamic range (HDR) output.

Computing device 120 includes a processor 122, a graphics processor 124, input/output (I/O) devices 126, and memory 128, coupled together. Processor 122 includes any technically feasible set of hardware units configured to process data and execute software applications. For example, processor 122 could include one or more central processing units (CPUs). Graphics processor 124 includes any technically feasible set of hardware units configured to process graphics data and execute graphics applications. For example, graphics processor 124 could include one or more graphics processing units (GPUs). I/O devices 126 include any technically feasible set of devices configured to perform input and/or output operations, including, for example, a universal serial bus (USB) port, among others. Memory 128 includes any technically feasible storage media configured to store data and software applications, such as, for example, a hard disk and/or a random-access memory (RAM) module, among others. Memory 128 includes a device driver 130 and a software application 132.

Device driver 130 includes program code that is executed by processor 122 to coordinate the operation of graphics processor 124. During execution, device driver 130 acts as an interface to graphics processor 124. Software application 132 includes program code that is executed by processor 122 to generate graphics processing tasks to be performed by graphics processor 124. In operation, software application 132 transmits these graphics processing tasks to device driver 130, and device driver 130 generates machine code that can be executed by graphics processor 124 to perform the graphics processing tasks. The graphics processing tasks could include, for example, graphics rendering operations, encoding operations, decoding operations, and so forth.

When performing graphics rendering operations, graphics processor 124 generates images on behalf of software application 132 and then causes display device 110 to display those images. For example, software application 132 could be a video game that leverages graphics processor 124 to render images depicting a simulating environment. Display device 110 could display these images to the user via display screen 112. Display screen 112 is described in greater detail below in conjunction with FIG. 2.

Figure 2:
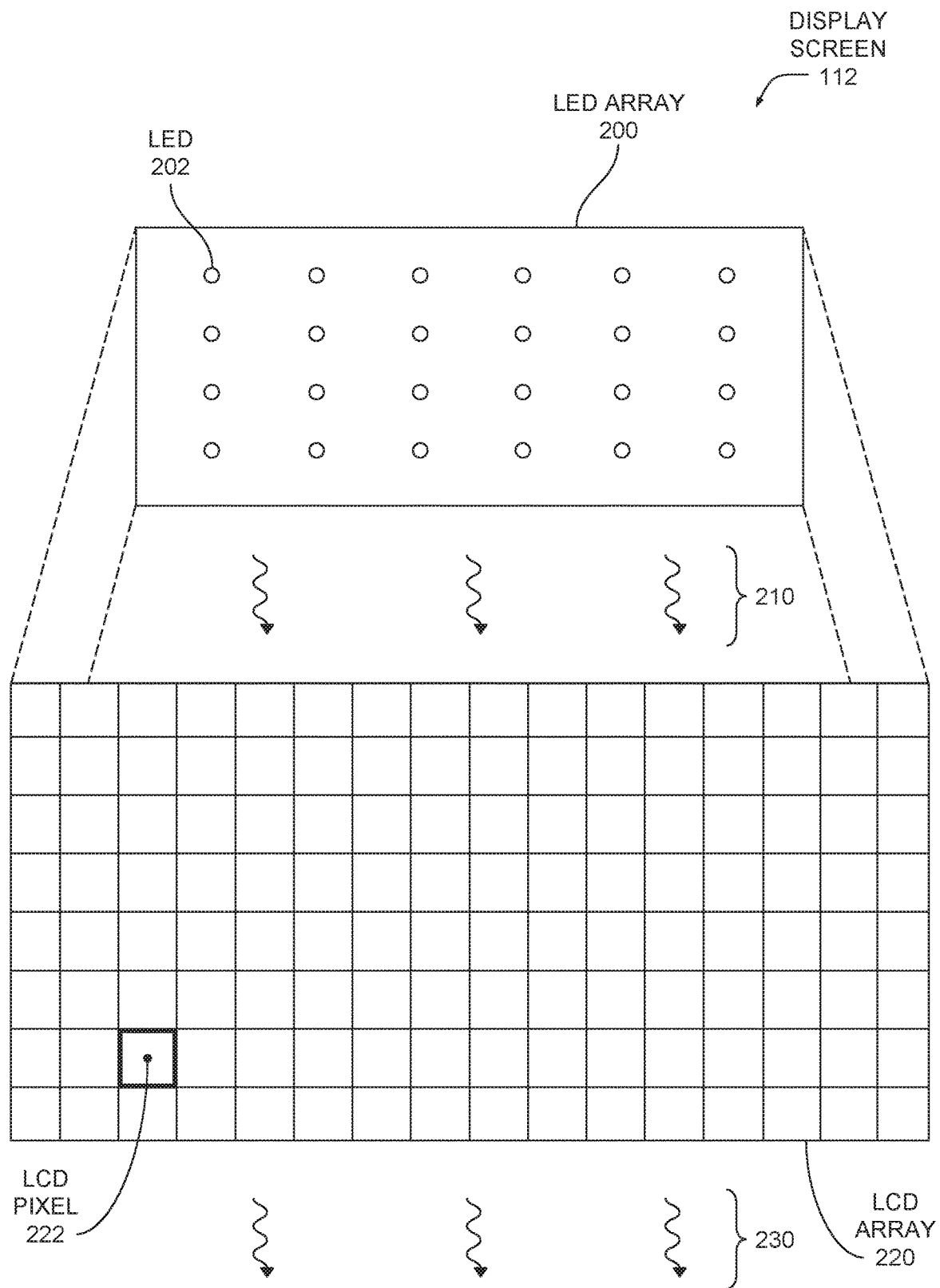
FIG. 2 is a more detailed illustration of the display screen of FIG. 1, according to various embodiments of the present invention.

FIG. 2 is a more detailed illustration of the display screen of FIG. 1, according to various embodiments of the present invention. As shown, display screen 112 includes an LED array 200 that includes a plurality of LEDs 202. LED array 200 may be known in the art as a "backlight." Display screen 112 also includes an LCD array 220 that includes a plurality of LCD pixels 222. LED array 200 is coupled to LCD array 220 and configured to emit light 210 to illuminate LCD array 220. LCD pixels 222 are at least partially translucent and therefore allow the re-transmission of any received light. Each LCD pixel 222 can be configured to filter the red, green, and blue (RGB) color components of light 210 and to then emit light 230 with a desired RGB color value. In one embodiment, the techniques described herein may be applied to LED arrays having any dimensionality, including one-dimensional "edge lit" backlights. The operation of an exemplary LCD pixel 222 is described in greater detail below in conjunction with FIG. 3.

Figure 3:
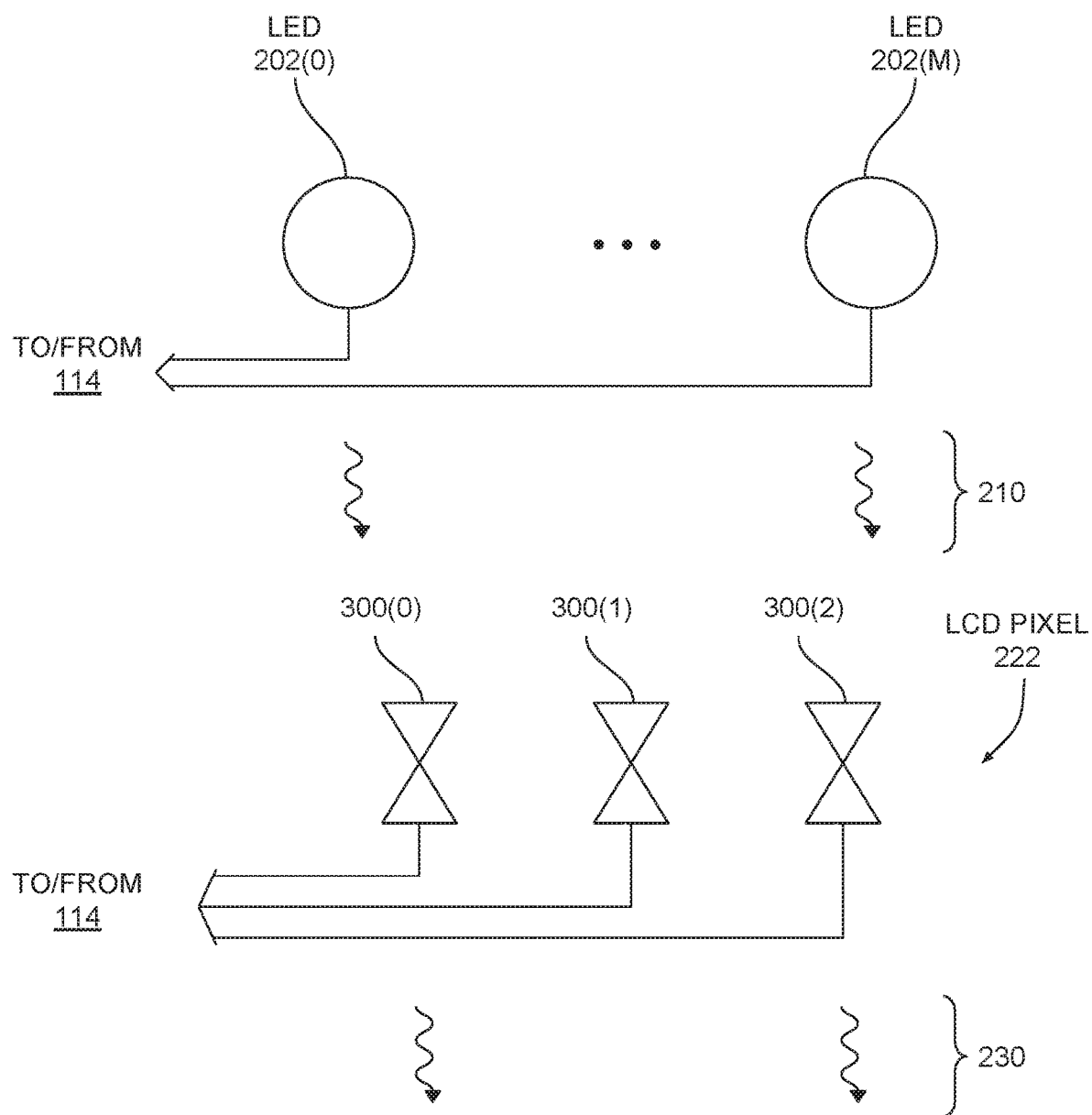
FIG. 3 is a more detailed illustration of one of the LCD pixels of FIG. 2, according to various embodiments of the present invention.

FIG. 3 is a more detailed illustration of an LCD pixel of FIG. 2, according to various embodiments of the present invention. As shown, an LCD pixel 222 includes valves 300(0), 300(1), and 300(2). A given valve 300 controls the amount of red, green, or blue light that is filtered by LCD pixel 222. In particular, valve 300(0) controls the filtering of red light, valve 300(1) controls the filtering of green light, and valve 300(2) controls the filtering of blue light. LCD pixel 222 receives light 210 from LEDs 202(0) through 202(M). LEDs 202(0) through 202(M) include some or all LEDs included in LED array 200. Based on the settings of valves 300, LCD pixel 222 filters light 210 and then outputs light 230 having a specific red, green, blue (RGB) color value.

Display controller 114 controls the brightness of LEDs 202 by supplying varying levels of current to each LED 202.

For example, display controller 114 could cause an LED 202 to output light with an elevated brightness by supplying an elevated current level to that LED. Display controller 114 controls the color of light emitted by LCD pixel 222 by setting different percentages with which valves 300 should filter red, green, and blue light. For example, display controller 114 could cause LCD pixel 222 to output a purely blue light by setting valves 300(0) and 300(1) to filter 100% of red light and 100% of green light and filter 0% of blue light, thereby allowing only the blue component of light 210 to pass through LCD pixel 222 relatively unfiltered. As a general matter, display controller 114 controls the operation of LEDs 202 and LCD pixels 222 based on the image to be displayed, as described in greater detail below in conjunction with FIG. 4.

Figure 4:
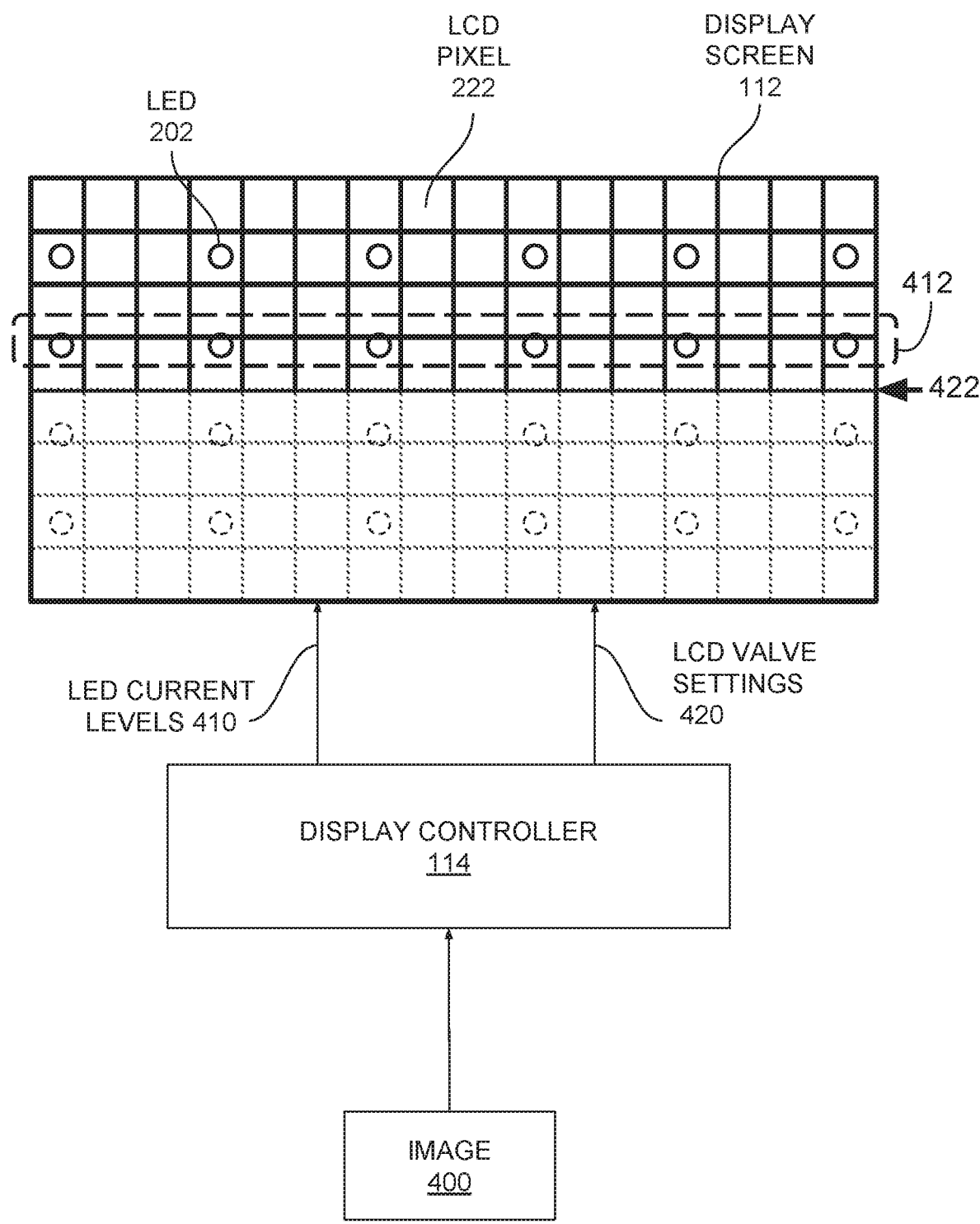
FIG. 4 illustrates how the display controller of FIG. 1 causes an image to be displayed, according to various embodiments of the present invention.

FIG. 4 illustrates how the display controller of FIG. 1 causes an image to be displayed, according to various embodiments of the present invention. As shown, display controller 114 receives an image 400 and then generates LED current levels 410 and LCD valve settings 420. When generating LED current levels 410, display controller 114 performs an image processing operation with image 400 to determine a target brightness for each LED 202. Display controller 114 then determines the specific current level that should be supplied to each LED 202 to achieve the target brightness.

When generating LCD valve settings 420 for image 400, display controller 114 maps each LCD pixel 222 to a different portion or pixel of image 400 to determine a target RGB color value for each LCD pixel 222. Display controller 114 also accumulates luminance contributions provided by some or all LEDs 202 to each LCD pixel 222 to generate a backlight illumination field (BLIF). Display controller 114 determines LCD valve settings 420 for LCD pixels 222 by dividing the target RGB color values by corresponding values included in the BLIF.

Display controller 114 refreshes display screen 112 by updating LED current levels 410 and updating LCD valve settings 420. Display controller 114 updates LCD valve settings 420 for LCD pixels 222 in scanline order, i.e. from left to right across a row of LCD pixels 222 in display screen 112 and from top to bottom across all rows in display screen 112. During a given refresh, display controller 114 implements a line counter that indicates an LCD vertical scan position corresponding to a row of LCD pixels 222 currently being updated. For example, as shown, LCD vertical scan position 422 could indicate a currently updated row of LCD pixels 222. In conjunction with and/or in parallel with updating rows of LCD pixels 222, display controller 114 also updates LED current settings 410 for corresponding rows of LEDs 202. For example, as also shown, display controller 114 could update a row 412 of LEDs 202 based on LCD vertical scan position 422.

Persons skilled in the art will understand that FIG. 4 is not drawn to scale. In practice, LCD pixels 222 are much smaller than LEDs 202 and so display screen 112 includes many more rows of LCD pixels 222 than rows of LEDs 202. In practice, display controller 114 updates sequential rows of LEDs 202 when specific LCD vertical scan positions have been reached.

According to these techniques, display controller 114 updates LCD pixels 222 in parallel with updating LEDs 202 to reduce refresh latency and improve the visual appearance of displayed images. Display controller 114 is described in greater detail below in conjunction with FIG. 5.

Display Controller for Updating LEDs and LCD Pixels in Parallel

Figure 5:
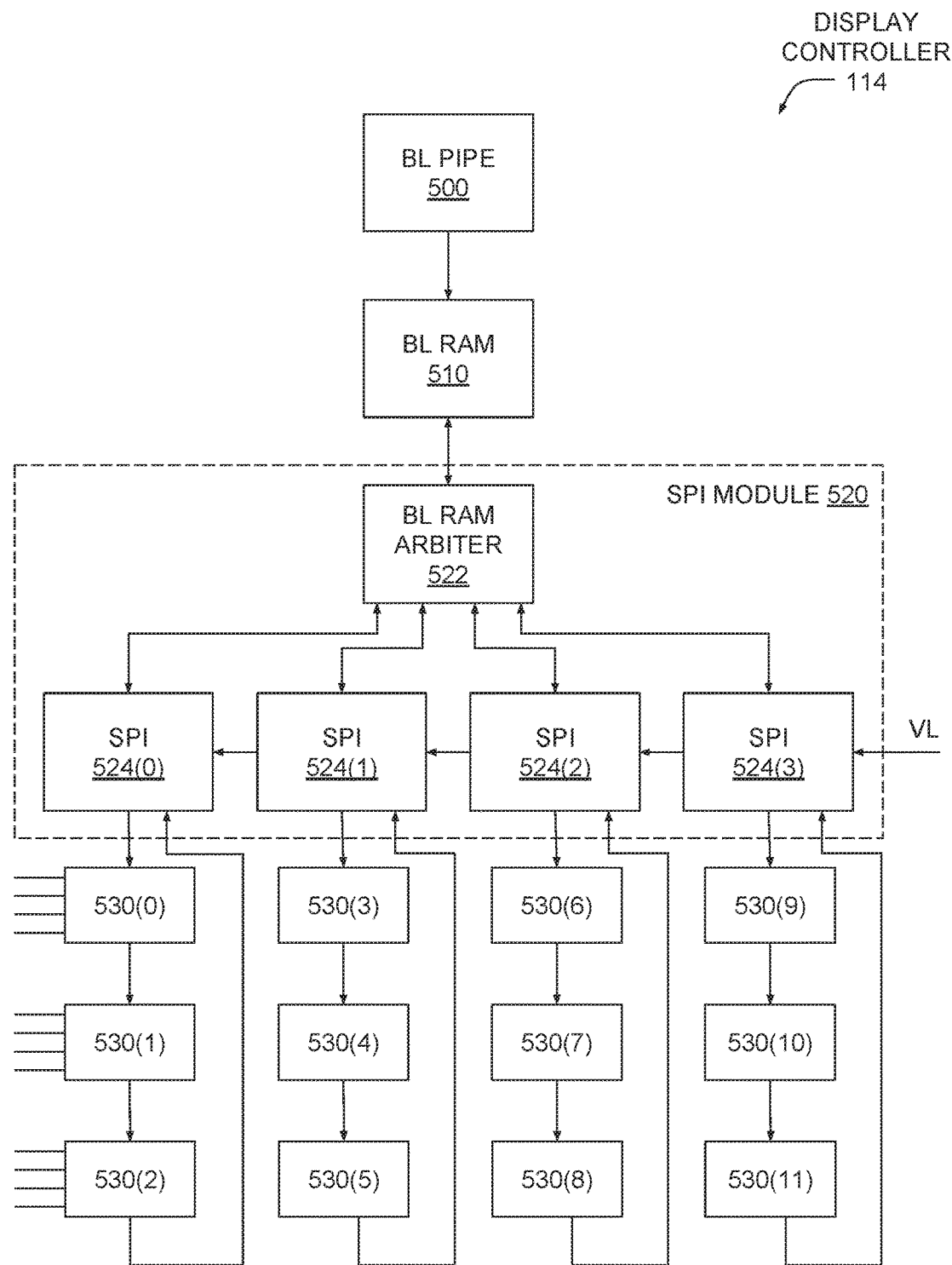
FIG. 5 is a more detailed illustration of the display controller of FIG. 4, according to various embodiments of the present invention.

FIG. 5 is a more detailed illustration of the display controller of FIG. 4, according to various embodiments of the present invention. As shown, display controller 114 includes a backlight (BL) pipeline 500, a BL random-access memory (RAM) 510, and a serial peripheral interface (SPI) module 520. SPI module 520 includes a BL RAM arbiter 522 and SPIs 524. SPI module 520 receives a video line (VL) signal from the line counter mentioned above (not shown) indicating the current LCD vertical scan position. The VL signal is cascaded from SPI 524(3) to SPI 524(0). Each SPI 524 is coupled to a chain of driver chips 530. SPI 524(0) is coupled to a chain of driver chips 530(0)-530(2), SPI 524(1) is coupled to a chain of driver chips 530(3)-530(5), SPI 524(2) is coupled to a chain of driver chips 530(6)-530(8), and SPI 524(3) is coupled to a chain of driver chips 530(9)-530(11). A given SPI 524 and corresponding chain of driver chips 530 controls the operation of a different subset of LEDs 202. A given driver chip 530 supplies current to a certain number of LEDs 202, typically 16 or 24 LEDs 202. Each driver chip 530 includes a set of registers (not shown) configured to store LED current settings for supplying the associated LEDs with current.

In operation, BL pipe 500 computes LED current settings 410 and populates BL RAM 510 with those LED current settings 410. BL RAM arbiter 522 coordinates read access requests received from SPIs 524 that target different portions of LED current settings 410 stored in BL RAM 510. A given SPI 524 reads specific portions of LED current settings 410 from BL RAM 510 and then writes some or all of those LED current settings to the driver chips 530 in the associated chain of driver chips. Those driver chips then update the current supplied to the LEDs coupled thereto based on the newly-written LED current settings. For example, SPI 524(0) could read a specific portion of LED current settings 410 from BL RAM 510 and then write those values to driver chips 530(0)-530(2). Driver chips 530 could then update the current supplied to a set of connected LEDs 202. In this manner, SPIs 524 can update the LED current settings for the subset of LEDs 202 connected thereto.

Each SPI 524 executes an SPI program that facilitates the rapid writing of LED current values to driver chips in relative synchrony with LCD vertical scan position. An exemplary SPI 524 configured in this manner is described in greater detail below in conjunction with FIG. 6.

Figure 6:
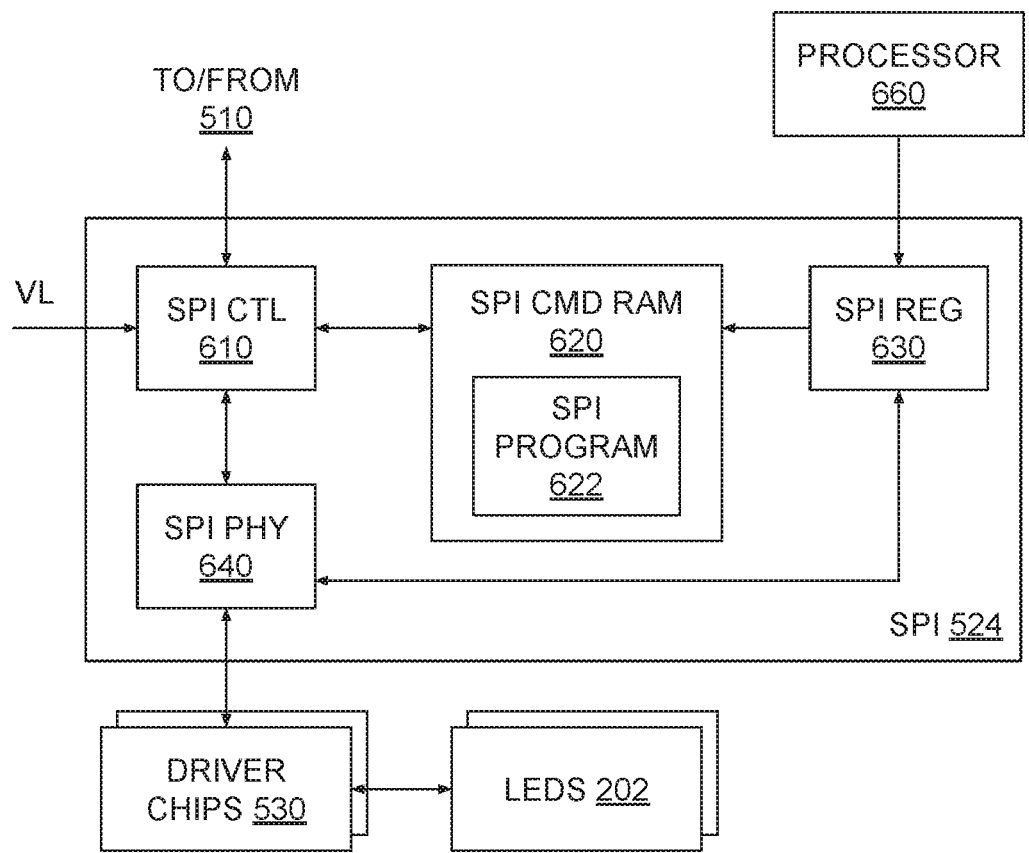
FIG. 6 is a more detailed illustration of one of the serial peripheral interfaces of FIG. 5, according to various embodiments of the present invention.

FIG. 6 is a more detailed illustration of one of the serial peripheral interfaces of FIG. 5, according to various embodiments of the present invention. As shown, an SPI 524 includes SPI controller (CTL) 610, SPI command (CMD) RAM 620, SPI registers (REG) 630, and SPI physical interface (PHY) 640. SPI 524 is coupled to a set of driver chips 530. Driver chips 530 are configured to supply current to a subset of LEDs 202. SPI 524 is also coupled to processor 660.

SPI CTL 610 interfaces with BL RAM 510 and SPI PHY 640. SPI CMD RAM 620 stores SPI program 622. SPI REG 630 allows the temporary storage of various values. SPI PHY 640 is a physical interface between SPI CTL 630 and driver chips 530 and is configured to output various signals on behalf of SPI CTL 610. Processor 660 initiates the operation of SPI 524.

In operation, SPI CTL 610 receives the VL signal indicating LCD vertical scan position. SPI CTL 610 reads SPI program 622 from SPI CMD RAM 620 and then executes different portions of this program depending on VL. SPI program 622 includes various SPI transactions associated with specific values of VL. One or more SPI transactions can be executed in order to read LED current settings from BL RAM 510 associated with a given value of VL and then write those LED current settings to the appropriate driver chips 530. For example, when VL indicates that the LCD vertical scan position has reached line number 512, then SPI controller 610 could execute an SPI transaction to read LED current settings from BL RAM 510 associated with line number 512. SPI CTL 610 would continue to execute the SPI transaction to write those LED current settings to the appropriate driver chips 530, thereby causing those driver chips to modify the current supplied to the connected LEDs 202. In this manner, SPI CTL 610 can update LED current settings in relative synchrony with the LCD vertical scan position.

Each SPI transaction included in SPI program 622 is configured to cause SPI controller 610 to write LED current settings to driver chips 530 in a particularly expeditious manner. More specifically, during execution of a given SPI transaction, SPI CTL 610 writes LED current settings to sequentially occurring LEDs in a "burst." SPI CTL 610 can execute multiple SPI transactions to write LED current settings in multiple bursts. When writing LED current settings in a burst, SPI CTL 610 can update the LED current settings for sequential LEDs in a limited number of clock cycles.

For example, suppose that the current settings for a first set of LEDs 202 coupled to a first driver chip 530 need to be updated when VL reaches a specific LCD vertical scan position. Suppose also that the LEDs included in the first set of LEDs are numbered 0, 1, 2, 5, 6, and 7. SPI CTL 610 would execute a first SPI transaction to update the LED current settings for LEDs 0, 1, and 2 in a first burst. SPI CTL 610 would execute a second SPI transaction to update the LED current settings for LEDs 5, 6, and 7 in a second burst. Updating LED current settings in bursts can reduce the amount of time needed to update an entire row of LEDs 202, thereby allowing the updating of LED current settings to track LCD vertical scan position and occur substantially in parallel with the updating of at least a portion of the LCD pixels 222 included within a given row of LCD pixels 222.

As described herein, operations are described as or can be understood as occurring "in parallel" with one another when those operations are performed at least partially simultaneously with one another, meaning that the operations overlap, at least in-part, during execution, and do not depend on one another to complete. For example, a row of LCD pixels 222 can be updated in parallel with a row of LEDs 202 because the updating of any given LCD pixel 222 in the row of LCD pixels 222 can occur simultaneously with, and independently of, the updating of any given LED 202 in the row of LEDs 202. In addition, operations are described as or can be understood as occurring "in substantial synchrony" with one another when those operations are performed at least partially within the same time interval.

Figure 7:
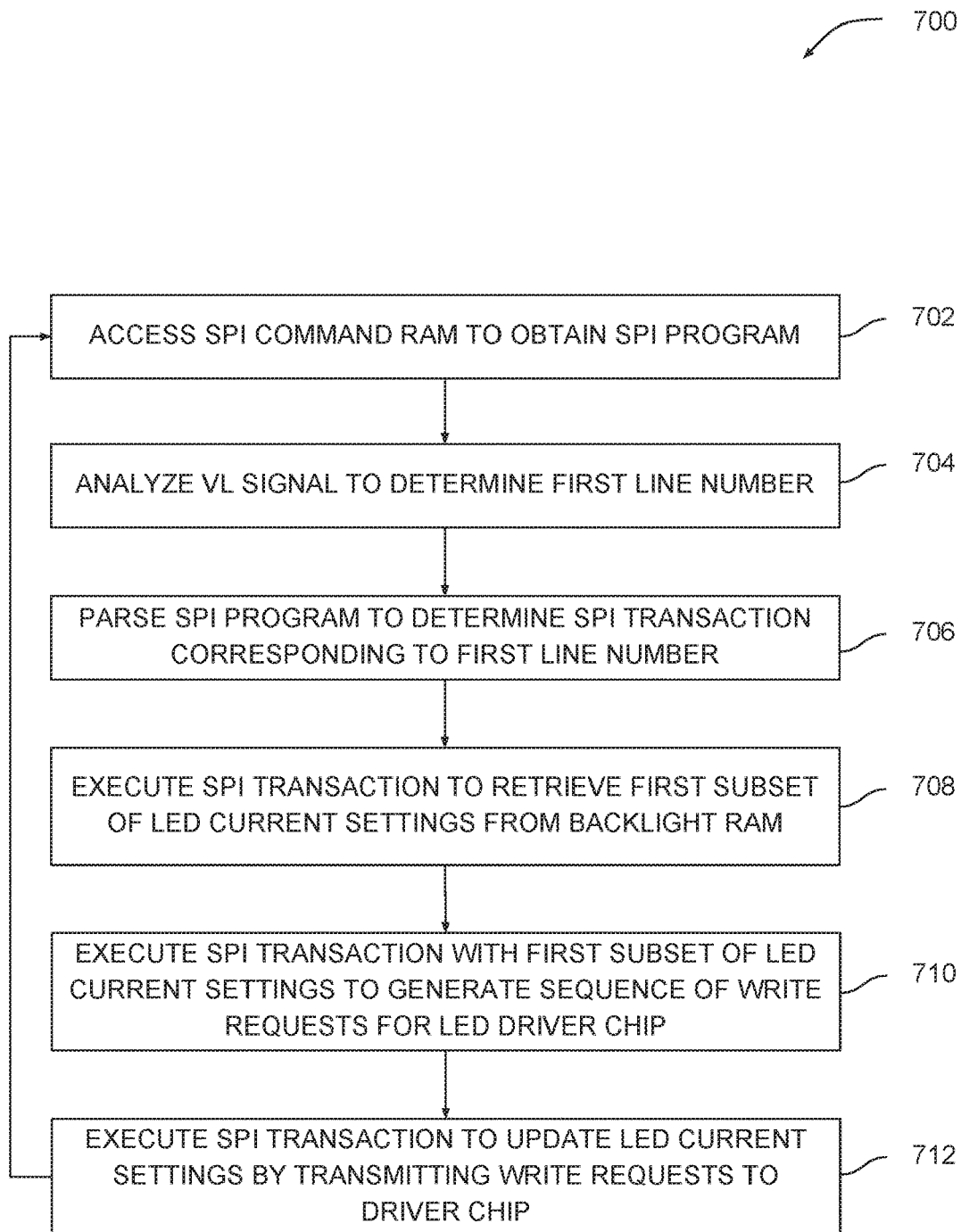
FIG. 7 is a flow diagram of method steps for updating a row of LEDs in parallel with updating a row of LCD pixels, according to various embodiments of the present invention.

As a general matter, SPI program 622 is generated in an offline manner and then pre-programmed into SPI CMD RAM 620. In particular, a compiler generates each SPI transaction within SPI program 622 by identifying specific sequences of LEDs 202 that can be updated in a single burst. The operation of this compiler is described in greater detail below in conjunction with FIGS. 8-9. FIG. 7 sets forth various steps performed by SPI CTL 610 to execute SPI program 622.

FIG. 7 is a flow diagram of method steps for updating a row of LEDs in parallel with updating a row of LCD pixels, according to various embodiments of the present invention. Although the method steps are described in conjunction with the systems of FIGS. 1-6, persons skilled in the art will understand that any system configured to perform the method steps in any order falls within the scope of the present invention.

As shown, a method 700 begins at step 702, where SPI CTL 610 accesses SPI CMD RAM 620 to obtain SPI program 622. In one embodiment, processor 660 performs this operation on behalf of SPI CTL 610 to initialize the operation of SPI 524. For example, processor 660 could read SPI program 622 into SPI REG 630 and then send some or all portions of SPI program 622 to SPI CTL 610 for execution.

At step 704, SPI CTL 610 analyzes the VL signal to determine a first line number. The first line number corresponds to the LCD vertical scan position. In operation, display controller 114 of FIG. 4 updates LCD pixels 222 in scanline order from left to right across a row of LCD pixels 222 and from top to bottom across many such rows. The VL signal indicates the particular row of LCD pixels 222 that is currently being updated.

At step 706, SPI CTL 610 determines one or more SPI transactions included in SPI program 622 that are associated with the first line number. A given SPI transaction can be executed to update one or more LEDs 202 coupled in a sequence to a given driver chip. Those LEDs 202 are typically arranged in the same horizontal row. In one embodiment, SPI transactions included in SPI program 622 are arranged in a sequence, where each SPI transaction can only be executed when a certain LCD vertical scan position has been reached.

At step 708, SPI CTL 610 executes an SPI transaction to retrieve a first subset of LED current settings 410 from BL RAM 510 based on the first line number. The SPI transaction includes various instructions for fetching specific portions of data from BL RAM 510. In one embodiment, those instructions can only be executed when the LCD vertical scan position reaches a pre-configured position.

At step 710, SPI CTL 610 executes the SPI transaction with the first subset of LED current settings 410 to generate a sequence of write requests to be executed by a specific driver chip. The sequence of write requests is associate with a "burst," as described above in conjunction with FIG. 6, and targets an uninterrupted sequence of LEDs coupled to a given driver chip. For example, the sequence of write requests could include a different write request for each of the first, second, and third LEDs coupled to a given driver chip.

At step 712, SPI CTL 610 executes the SPI transaction to update the LED current settings for a subset of LEDs 202 by transmitting the write requests generated at step 710 to the specific driver chip. In this manner, SPI CTL 610 can update LED current settings for groups of LEDs 202 very quickly and in relative synchrony with the LCD vertical scan position.

Advantageously, LED current settings can be updated rapidly across an entire row of LEDs without delaying LED updates until LCD vertical scan reaches the bottom of display screen 112. In addition, because rows of LEDs 202 are updated in parallel with rows of LCD pixels 222, certain visual artifacts found in conventional display devices can be reduced or eliminated.

Compiler for Generating an SPI Program

Figure 8:
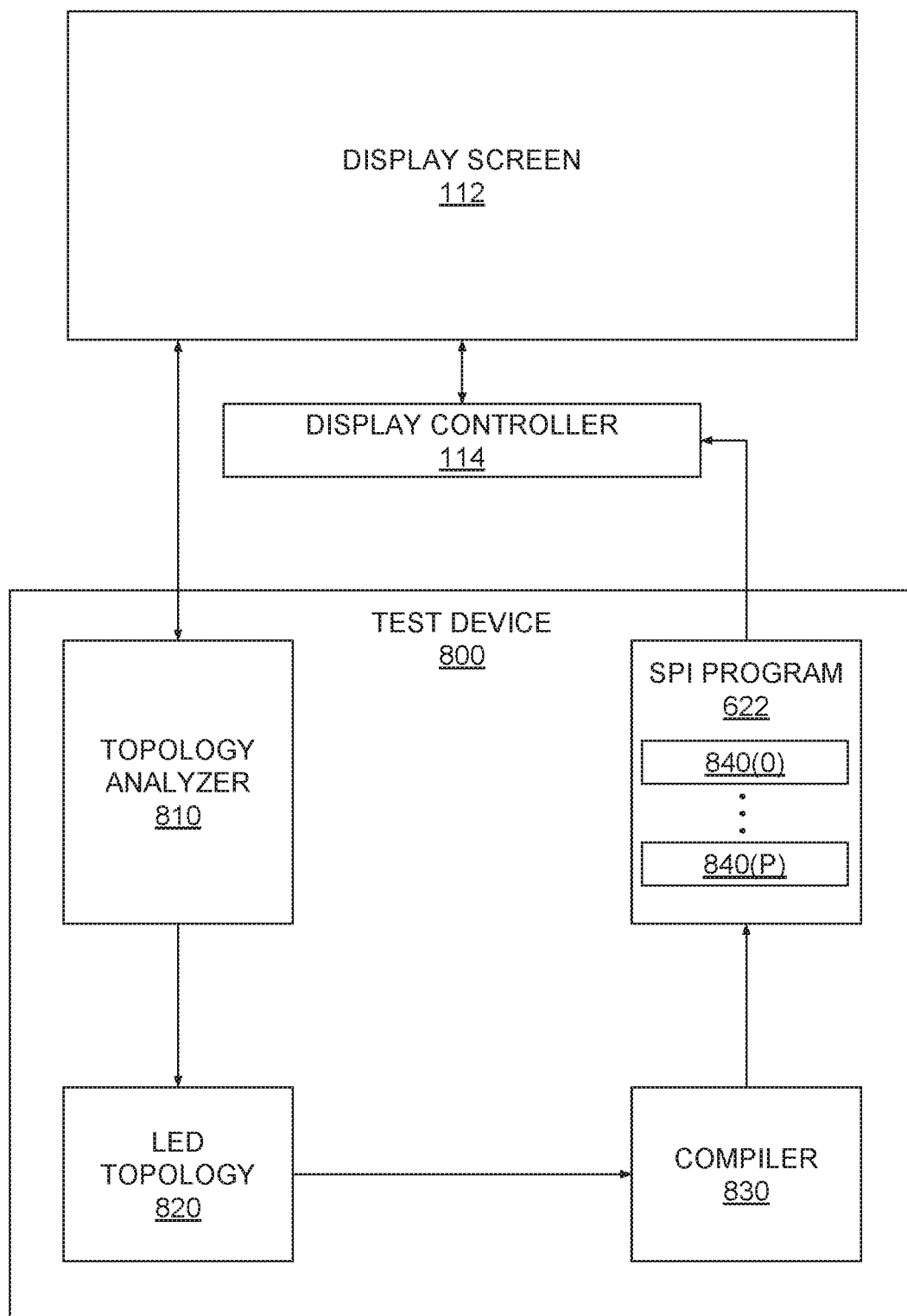
FIG. 8 illustrates how a compiler generates the SPI program of FIG. 6, according to various embodiments of the present invention.

FIG. 8 illustrates how a compiler generates the SPI program of FIG. 6, according to various embodiments of the present invention. As shown, a test device 800 is coupled to display screen 112 and display controller 114 of display device 110. Test device 800 is deployed in a laboratory setting in order to gather information associated with the manufacture of display screen 112. Test device 800 includes a topology analyzer 810, LED topology 820, a compiler 830, and SPI program 622 of FIG. 6. SPI program 622 includes SPI transactions 840(0) through 840(P). Topology analyzer 810 and compiler 830 may be software applications that execute on a processor included in test device 800. Topology analyzer 810 may also be a hardware component included in, or coupled to, test device 800.

In operation, topology analyzer 810 analyzes the arrangement and wiring of LEDs 202 included in display screen 112 to generate LED topology 820. In one embodiment, topology analyzer 810 may analyze a design specification associated with display screen 112 to generate LED topology 820. LED topology 820 is a data structure that maps the screen position of each LED 202 to the wiring configuration for each LED 202. In practice, LED topology 820 is a two-dimensional (2D) spreadsheet of cells, although any technically feasible data structure also falls within the scope of the present embodiments. Each cell is located at a particular row and column of the spreadsheet and describes the wiring configuration for an LED 202 that is located at a corresponding row and column (in an LED-based coordinate system) of display screen 112. A given cell includes a three-dimensional (3D) coordinate for a corresponding LED 202 that includes the SPI number, driver chip number, and LED number for that LED 202. An exemplary portion of LED topology 820 is shown below in Table 1:

TABLE 1

|   | 0 | 1 | 2 | 3 | 4 | 5 |
|---|---|---|---|---|---|---|
| 0 | 3, 0, 11 | 3, 0, 10 | 3, 0, 9 | 3, 0, 8 | 3, 0, 7 | 3, 0, 6 |
| 1 | 3, 1, 7 | 3, 1, 6 | 3, 1, 5 | 3, 1, 4 | 3, 1, 3 | 3, 1, 2 |
| 2 | 3, 2, 3 | 3, 2, 2 | 3, 2, 1 | 3, 2, 0 | 3, 1, 15 | 3, 1, 14 |
| 3 | 3, 2, 15 | 3, 2, 14 | 3, 2, 13 | 3, 2, 12 | 3, 2, 11 | 3, 2, 10 |
| 4 | 3, 3, 11 | 3, 3, 10 | 3, 3, 9 | 3, 3, 8 | 3, 3, 7 | 3, 3, 6 |
| 5 | 3, 4, 7 | 3, 4, 6 | 3, 4, 5 | 3, 4, 4 | 3, 4, 3 | 3, 4, 2 |
| 6 | 3, 5, 3 | 3, 5, 2 | 3, 5, 1 | 3, 5, 0 | 3, 4, 15 | 3, 4, 14 |
| 7 | 3, 5, 15 | 3, 5, 14 | 3, 5, 13 | 3, 5, 12 | 3, 5, 11 | 3, 5, 10 |

As shown in Table 1, an LED 202 located at row 2, column 2 of display screen 112 has a wiring configuration of (3, 2, 1). The first coordinate of this wiring configuration indicates that the LED 202 is coupled to a third SPI. The second coordinate indicates that the LED 202 is coupled to the second driver chip of the third SPI. The third coordinate indicates that the LED 202 is the first LED 202 coupled to that third driver chip. In one embodiment, topology analyzer 810 may generate LED topology 820 by transmitting a multitude of test signals to display screen 112 and then observing, via one or more optical sensors, which LEDs become active in response to those test signals.

Compiler 830 processes LED topology 820 to generate SPI program 622. In doing so, compiler 622 groups together sequential LEDs 202 that can be updated together in a single burst and then generates an SPI transaction 830 to implement each such burst. Compiler 830 performs this grouping using a greedy algorithm that is implemented as follows.

First, compiler 830 selects a row of 3D coordinates from LED topology 820. Compiler 830 iteratively processes all rows of 3D coordinates, but just one row iteration is described here for clarity. Second, compiler 830 selects an SPI number. Compiler 830 iterates through each SPI number for any given row, but just one SPI number iteration for the selected row is described here for clarity.

For the selected row and selected SPI number, compiler 830 groups together any LEDs 202 that are driven by the same driver chip. For example, referring to FIG. 5, compiler 830 could group together all LEDs included in the selected row that are coupled to driver chip 530(3) of SPI 524(1). Compiler 830 then numerically sorts the numbers assigned to LEDs 202 within each group to identify uninterrupted sequences of LED numbers that increment by one. For each such sequence, compiler 830 generates a different SPI transaction 840. For example, suppose a given driver chip is coupled to LEDs 202 numbered 0, 1, 2, 3, 7, 8, and 9. Compiler 830 would identify a first sequence that includes LEDs 202 numbered 0, 1, 2, and 3 as well as a second sequence that includes LEDs 202 numbered 7, 8, and 9. Compiler 830 would then generate a first SPI transaction 840 corresponding to the first sequence and a second SPI transaction 840 corresponding to the second sequence.

Compiler 830 performs the above steps to process sequential rows of LEDs 202 one row at a time to generate SPI transactions 840 for each row. The SPI transactions 840 associated with a given row of LEDs 202 can be executed during a screen refresh to fetch new LED current settings and then write those LED current settings to the appropriate driver chips. Because compiler 830 generates SPI transactions 840 corresponding to bursts of sequential LEDs 202, multiple LEDs 202 can be updated when executing a given SPI transaction 840. This approach allows an entire row of LEDs 202 to be updated very quickly. In addition, because LEDs 202 are updated at the granularity of individual rows, the updating of these rows can be performed in a coordinated fashion with LCD vertical scan position.

In one embodiment, a given SPI transaction 840 indicates a specific LCD vertical scan position that must be reached before the SPI transaction 640 can be executed. The LCD vertical scan position can be derived based on the LED row number. This approach addresses differences between the number of LCD pixel rows and the number of LED rows. For example, row zero of LEDs 202 could reside closest to row 16 of LCD pixels 222. Accordingly, an SPI transaction 840 that updates row zero of LEDs 202 could only be executed when the LCD vertical scan position reaches row 16 of LCD pixels 222.

Once compiler 830 generates SPI program 622, test device 800 stores SPI program 622 in firmware that is accessible to display controller 114. Test device 800 can generate many different SPI programs based on different LED topologies associated with different types of display screens. An advantage of this technique is that any display device having any technically feasible LED topology can be programmed to perform the various techniques described herein.

Figure 9:
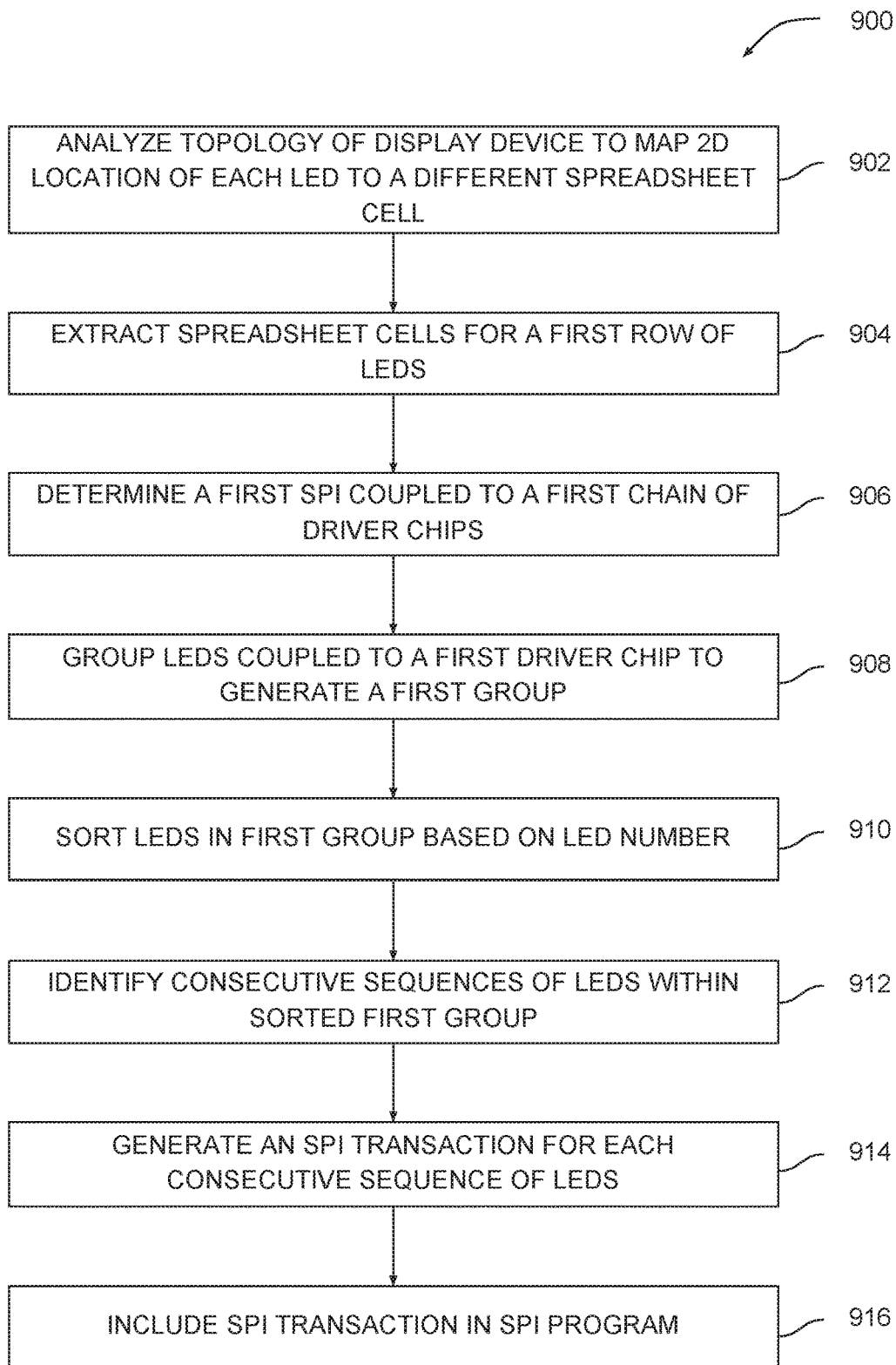
FIG. 9 is a flow diagram of method steps for generating an SPI program from LED topology data, according to various embodiments of the present invention.

FIG. 9 is a flow diagram of method steps for generating an SPI program from LED topology data, according to various embodiments of the present invention. Although the method steps are described in conjunction with the systems of FIGS. 1-8, persons skilled in the art will understand that any system configured to perform the method steps in any order falls within the scope of the present invention.

As shown, a method 900 begins at step 902, where topology generator 810 within test device 800 analyzes the topology of display screen 112 to map the 2D location of each LED 202 to a specific cell of a spreadsheet included in LED topology 820. As described above in conjunction with Table 1, each spreadsheet cell is located at a particular row and column and stores a wiring configuration for an LED 202 that is located at a corresponding row and column of display screen 112. Further, a given wiring configuration is a three-dimensional (3D) coordinate for the corresponding LED 202 that describes the SPI number, driver chip number, and LED number for the LED 202.

At step 904, compiler 830 within test device 800 extracts the spreadsheet cells for a first row of LEDs 202. Compiler 830 operates iteratively with each row of the spreadsheet defined by LED topology 820. Just one iteration is described in conjunction with the method 900 for clarity. In practice, compiler 830 processes the spreadsheet row by row in order to generate SPI transactions 840 that can be executed to update the entire row of LEDs 202.

At step 906, compiler 840 determines a first SPI coupled to a first chain of driver chips. Compiler 840 generally iterates through each SPI number for any given row of LEDs 202 and evaluates a corresponding chain of driver chips coupled to the SPI associated with any given SPI number. For clarity, though, just one SPI number, corresponding SPI, and associated chain of driver chips is described in conjunction with the method 900.

At step 908, compiler 830 groups LEDs 202 coupled to a first driver chip to generate a first group. A given driver chip can typically supply current to 16 or 24 LEDs 202, among other configurations. Drive chips include separate registers for each LED 202 that store current settings for supplying the associated LEDs 202 with current. These registers can be updated with LED current settings to change the brightness of the associated LEDs 202.

At step 910, compiler 830 sorts the LEDs 202 in the first group based on LED number. LEDs 202 coupled to a given driver chip are assigned a number that corresponds to a specific pin output of the given driver chip. For example, for a driver chip that can drive 16 LEDs 202, each LED 202 coupled thereto could be assigned an LED number from 0-15.

At step 912, compiler 830 identifies consecutive sequences of LEDs 202 within the sorted first group based on sequentially occurring LED numbers that increment by one. These consecutive sequences of LEDs 202 are connected to the associated driver chip by adjacent pins, thereby allowing these LEDs 202 to be updated together in a single burst.

At step 914, compiler 830 generates an SPI transaction 840 for each consecutive sequence of LEDs. The SPI transaction 840 can be executed by SPI CTL 610 of FIG. 6 in order to update each LED 202 associated with the sequence of LEDs 202 identified at step 912. In one embodiment, SPI CTL 610 can update all LEDs associated with one or more SPI transactions 840 in response to a single update signal.

At step 916, compiler 830 generates SPI program 622 to include the SPI transaction generated at step 914. Compiler 830 may repeat steps 904, 906, 908, 910, 912, and 914 with different rows of LEDs 202 and different SPIs in order to generate transactions 840 for updating all LEDs 202 included in display screen 112. Test device 800 stores the completed SPI program 622 in display controller 114. Test device 800 can perform the method 900 with many different display devices to generate SPI programs tailored to the specific topology of those display devices.

In sum, a display controller within a display device includes SPI that coordinates the updating of current settings for groups of LEDs. The SPI controller operates in synchrony with an LCD vertical scan position in order to update the current settings for rows of LEDs in parallel with the updating of nearby rows of LCD pixels during a screen refresh. When updating a row of LEDs, the SPI controller executes one or more SPI transactions included in an SPI program to write current settings for multiple LEDs nearly simultaneously. A compiler generates the SPI program based on the topology of LEDs included in the display device.

The SPI program is generated based on a spreadsheet that defines the topology of LEDs included in the display device. Specifically, for each LED, the spreadsheet indicates an SPI number, a driver chip number, and an LED number. The spreadsheet is generated when configuring a specific type of display device. A compiler compiles the spreadsheet to generate the SPI program. In doing so, the compiler implements a greedy algorithm to sort LEDs based on SPI number, driver chip number and LED number and then group together continuous sequences of LEDs. These continuous sequences of LEDs can be updated nearly simultaneously in the manner described above. For each continuous sequence of LEDs, the compiler generates an SPI transaction to be included in the SPI program.

At least one technological advantage of the disclosed techniques relative to the prior art is that LED current settings can be updated rapidly across an entire row of LEDs in substantial synchrony with LCD vertical scan position when refreshing the display screen. Accordingly, the updating of LED current settings need not be delayed until LCD vertical scan reaches the bottom of the display screen, thus eliminating the lag found in conventional systems. In addition, rows of LEDs are updated in parallel with rows of LCDs, thereby reducing or eliminating certain visual artifacts generated in conventional systems when LEDs and LCD pixels are updated separately. These different technological advantages represent one or more technological advancements over prior art techniques.

1. Some embodiments include a computer-implemented method for causing a display device to display an image, the method comprising determining a first portion of a topology based on a first vertical scan position of the display device, wherein the first portion of the topology includes a first set of wiring configurations and indicates a first set of light sources included in the display device that are related to the first set of wiring configurations, determining a first subset of the wiring configurations based on one or more topological criteria associated with the display device, wherein the first subset of the wiring configurations corresponds to a first subset of the light sources, and generating at least one instruction based on the first subset of the wiring configurations, wherein the display device executes the at least one instruction upon reaching the first vertical scan position to update the first subset of the light sources in order to display at least a portion of the image.

2. The computer-implemented method of clause 1, wherein determining the first subset of the wiring configurations comprises determining a first serial peripheral interface included in the display device based on the first set of wiring configurations, determining a first chain of driver chips coupled to the first serial peripheral interface based on the first set of wiring configurations, determining a first driver chip included in the first chain of driver chips based on the first set of wiring configurations, and determining one or more sequentially occurring pins of the first driver chip based on the first set of wiring configurations, wherein the first subset of the light sources is coupled to the one or more sequentially occurring pins, and wherein the one or more topological criteria is met by any wiring configuration that corresponds to a light source coupled to a sequentially occurring pin of a given driver chip that is included in a given chain of driver chips coupled to a given serial peripheral interface.

3. The computer-implemented method of any of clauses 1-2, wherein determining the first subset of the wiring configurations based on the one or more topological criteria comprises identifying any wiring configuration that corresponds to a light source included in the display device that is coupled to a specific serial peripheral interface included in the display device.

4. The computer-implemented method of any of clauses 1-3, wherein determining the first subset of the wiring configurations based on the one or more topological criteria comprises identifying any wiring configuration that corresponds to a light source included in the display device that is coupled to a specific driver chip included in the display device, wherein the specific driver chip resides within a chain of driver chips that is coupled to a specific serial peripheral interface included in the display device.

5. The computer-implemented method of any of clauses 1-4, wherein determining the first subset of the wiring configurations based on the one or more topological criteria comprises identifying any wiring configuration that corresponds to a light source included in the display device that is coupled to sequentially occurring pins of a specific driver chip included in the display device, wherein the specific driver chip resides within a chain of driver chips that is coupled to a specific serial peripheral interface included in the display device.

6. The computer-implemented method of any of clauses 1-5, wherein the topology includes a plurality of rows corresponding to a plurality of rows of light sources included in the display device and a plurality of columns corresponding to a plurality of columns of light sources included in the display device, and wherein determining the first portion of the topology comprises automatically mapping the first vertical scan position to a first row included in the plurality of rows included in the topology.

7. The computer-implemented method of any of clauses 1-6, further comprising generating the first portion of the topology by automatically mapping each screen coordinate associated with the first set of light sources to a different wiring configuration included in the first set of wiring configurations.

8. The computer-implemented method of any of clauses 1-7, wherein a first wiring configuration included in the first set of wiring configurations indicates at least one of a first serial peripheral interface coupled to a first light source included in the first set of light sources, a first driver chip coupled to the first light source, and a first pin coupled to the first light source, and wherein the first serial peripheral interface is coupled to a first chain of driver chips that includes the first driver chip, and the first driver chip includes the first pin.

9. The computer-implemented method of any of clauses 1-8, wherein the first set of instructions comprises a burst transaction that is executed by a first serial peripheral interface included in the display device during a single clock cycle.

10. The computer-implemented method of any of clauses 1-9, wherein the display device updates a first subset of screen pixels at least partially in parallel with updating the first subset of light sources upon reaching the first vertical scan position.

11. Some embodiments include a non-transitory computer-readable medium storing program instructions that, when executed by a processor, causes the processor to generate instructions for causing a display device to display an image by performing the steps of determining a first portion of a topology based on a first vertical scan position of the display device, wherein the first portion of the topology includes a first set of wiring configurations and indicates a first set of light sources included in the display device that are related to the first set of wiring configurations, determining a first subset of the wiring configurations based on one or more topological criteria associated with the display device, wherein the first subset of the wiring configurations corresponds to a first subset of the light sources, and generating at least one instruction based on the first subset of the wiring configurations, wherein the display device executes the at least one instruction upon reaching the first vertical scan position to update the first subset of the light sources in order to display at least a portion of the image.

12. The non-transitory computer-readable medium of clause 11, wherein the step of determining the first subset of the wiring configurations comprises determining a first serial peripheral interface included in the display device based on the first set of wiring configurations, determining a first chain of driver chips coupled to the first serial peripheral interface based on the first set of wiring configurations, determining a first driver chip included in the first chain of driver chips based on the first set of wiring configurations, and determining one or more sequentially occurring pins of the first driver chip based on the first set of wiring configurations, wherein the first subset of the light sources is coupled to the one or more sequentially occurring pins, and wherein the one or more topological criteria is met by any wiring configuration that corresponds to a light source coupled to a sequentially occurring pin of a given driver chip that is included in a given chain of driver chips coupled to a given serial peripheral interface.

13. The non-transitory computer-readable medium of any of clauses 11-12, wherein the step of determining the first subset of the wiring configurations based on the one or more topological criteria comprises identifying any wiring configuration that corresponds to a light source included in the display device that is coupled to a specific serial peripheral interface included in the display device.

14. The non-transitory computer-readable medium of any of clauses 11-13, wherein the step of determining the first subset of the wiring configurations based on the one or more topological criteria comprises identifying any wiring configuration that corresponds to a light source included in the display device that is coupled to a specific driver chip included in the display device, wherein the specific driver chip resides within a chain of driver chips that is coupled to a specific serial peripheral interface included in the display device.

15. The non-transitory computer-readable medium of any of clauses 11-14, wherein the step of determining the first subset of the wiring configurations based on the one or more topological criteria comprises identifying any wiring configuration that corresponds to a light source included in the display device that is coupled to sequentially occurring pins of a specific driver chip included in the display device, wherein the specific driver chip resides within a chain of driver chips that is coupled to a specific serial peripheral interface included in the display device.

16. The non-transitory computer-readable medium of any of clauses 11-15, wherein the topology includes a plurality of rows corresponding to a plurality of rows of light sources included in the display device and a plurality of columns corresponding to a plurality of columns of light sources included in the display device, and wherein the step of determining the first portion of the topology comprises automatically mapping the first vertical scan position to a first row included in the plurality of rows included in the topology.

17. The non-transitory computer-readable medium of any of clauses 11-16, wherein the first set of instructions comprises a burst transaction that is executed by a first serial peripheral interface included in the display device during a single clock cycle.

18. The non-transitory computer-readable medium of any of clauses 11-17, further comprising the step of generating one or more additional instructions based on a second subset of the wiring configurations, wherein the display device executes the one or more additional instructions upon reaching the second vertical scan position to update a second subset of the light sources, thereby displaying at least another portion of the image.

19. The non-transitory computer-readable medium of any of clauses 11-18, wherein the second subset of the wiring configurations is generated by determining a second serial peripheral interface included in the display device based on the second set of wiring configurations, determining a second chain of driver chips coupled to the second serial peripheral interface based on the second set of wiring configurations, determining a second driver chip included in the second chain of driver chips based on the second set of wiring configurations, and determining one or more additional sequentially occurring pins of the second driver chip based on the second set of wiring configurations, wherein the second subset of the light sources is coupled to the one or more additional sequentially occurring pins, and wherein the one or more topological criteria is met by any wiring configuration that corresponds to a light source coupled to a sequentially occurring pin of a given driver chip that is included in a given chain of driver chips coupled to a given serial peripheral interface.

20. Some embodiments include a system, comprising a memory storing a compiler, and a processor that, when executing the compiler, is configured to perform the steps of determining a first portion of a topology based on a first vertical scan position of the display device, wherein the first portion of the topology includes a first set of wiring configurations and indicates a first set of light sources included in the display device that are related to the first set of wiring configurations, determining a first subset of the wiring configurations based on one or more topological criteria associated with the display device, wherein the first subset of the wiring configurations corresponds to a first subset of the light sources, and generating at least one instruction based on the first subset of the wiring configurations, wherein the display device executes the at least one instruction upon reaching the first vertical scan position to update the first subset of the light sources in order to display at least a portion of an image.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for causing a display device to display an image, the method comprising:
   determining a first portion of a topology based on a first vertical scan position of the display device, wherein the first portion of the topology includes a first set of wiring configurations and indicates a first set of light sources included in the display device that are related to the first set of wiring configurations;
   determining a first subset of the wiring configurations based on one or more topological criteria associated with the display device, wherein the first subset of the wiring configurations corresponds to a first subset of the light sources; and
   generating at least one instruction based on the first subset of the wiring configurations, wherein the display device executes the at least one instruction upon reaching the first vertical scan position to update the first subset of the light sources in order to display at least a portion of the image.

2. The computer-implemented method of claim 1, wherein determining the first subset of the wiring configurations comprises:
   determining a first serial peripheral interface included in the display device based on the first set of wiring configurations;
   determining a first chain of driver chips coupled to the first serial peripheral interface based on the first set of wiring configurations;
   determining a first driver chip included in the first chain of driver chips based on the first set of wiring configurations; and
   determining one or more sequentially occurring pins of the first driver chip based on the first set of wiring configurations,
   wherein the first subset of the light sources is coupled to the one or more sequentially occurring pins, and wherein the one or more topological criteria is met by any wiring configuration that corresponds to a light source coupled to a sequentially occurring pin of a given driver chip that is included in a given chain of driver chips coupled to a given serial peripheral interface.

3. The computer-implemented method of claim 1, wherein determining the first subset of the wiring configurations based on the one or more topological criteria comprises identifying any wiring configuration that corresponds to a light source included in the display device that is coupled to a specific serial peripheral interface included in the display device.

4. The computer-implemented method of claim 1, wherein determining the first subset of the wiring configurations based on the one or more topological criteria comprises identifying any wiring configuration that corresponds to a light source included in the display device that is coupled to a specific driver chip included in the display device, wherein the specific driver chip resides within a chain of driver chips that is coupled to a specific serial peripheral interface included in the display device.

5. The computer-implemented method of claim 1, wherein determining the first subset of the wiring configurations based on the one or more topological criteria comprises identifying any wiring configuration that corresponds to a light source included in the display device that is coupled to sequentially occurring pins of a specific driver chip included in the display device, wherein the specific driver chip resides within a chain of driver chips that is coupled to a specific serial peripheral interface included in the display device.

6. The computer-implemented method of claim 1, wherein the topology includes a plurality of rows corresponding to a plurality of rows of light sources included in the display device and a plurality of columns corresponding to a plurality of columns of light sources included in the display device, and wherein determining the first portion of the topology comprises automatically mapping the first vertical scan position to a first row included in the plurality of rows included in the topology.

7. The computer-implemented method of claim 1, further comprising generating the first portion of the topology by automatically mapping each screen coordinate associated with the first set of light sources to a different wiring configuration included in the first set of wiring configurations.

8. The computer-implemented method of claim 1, wherein a first wiring configuration included in the first set of wiring configurations indicates at least one of a first serial peripheral interface coupled to a first light source included in the first set of light sources, a first driver chip coupled to the first light source, and a first pin coupled to the first light source, and wherein the first serial peripheral interface is coupled to a first chain of driver chips that includes the first driver chip, and the first driver chip includes the first pin.

9. The computer-implemented method of claim 1, wherein the first set of instructions comprises a burst transaction that is executed by a first serial peripheral interface included in the display device during a single clock cycle.

10. The computer-implemented method of claim 1, wherein the display device updates a first subset of screen pixels at least partially in parallel with updating the first subset of light sources upon reaching the first vertical scan position.

11. A non-transitory computer-readable medium storing program instructions that, when executed by a processor, causes the processor to generate instructions for causing a display device to display an image by performing the steps of:
   determining a first portion of a topology based on a first vertical scan position of the display device, wherein the first portion of the topology includes a first set of wiring configurations and indicates a first set of light sources included in the display device that are related to the first set of wiring configurations;
   determining a first subset of the wiring configurations based on one or more topological criteria associated with the display device, wherein the first subset of the wiring configurations corresponds to a first subset of the light sources; and
   generating at least one instruction based on the first subset of the wiring configurations, wherein the display device executes the at least one instruction upon reaching the first vertical scan position to update the first subset of the light sources in order to display at least a portion of the image.

12. The non-transitory computer-readable medium of claim 11, wherein the step of determining the first subset of the wiring configurations comprises:
- determining a first serial peripheral interface included in the display device based on the first set of wiring configurations;
- determining a first chain of driver chips coupled to the first serial peripheral interface based on the first set of wiring configurations;
- determining a first driver chip included in the first chain of driver chips based on the first set of wiring configurations; and
- determining one or more sequentially occurring pins of the first driver chip based on the first set of wiring configurations,
- wherein the first subset of the light sources is coupled to the one or more sequentially occurring pins, and wherein the one or more topological criteria is met by any wiring configuration that corresponds to a light source coupled to a sequentially occurring pin of a given driver chip that is included in a given chain of driver chips coupled to a given serial peripheral interface.

13. The non-transitory computer-readable medium of claim 11, wherein the step of determining the first subset of the wiring configurations based on the one or more topological criteria comprises identifying any wiring configuration that corresponds to a light source included in the display device that is coupled to a specific serial peripheral interface included in the display device.

14. The non-transitory computer-readable medium of claim 11, wherein the step of determining the first subset of the wiring configurations based on the one or more topological criteria comprises identifying any wiring configuration that corresponds to a light source included in the display device that is coupled to a specific driver chip included in the display device, wherein the specific driver chip resides within a chain of driver chips that is coupled to a specific serial peripheral interface included in the display device.

15. The non-transitory computer-readable medium of claim 11, wherein the step of determining the first subset of the wiring configurations based on the one or more topological criteria comprises identifying any wiring configuration that corresponds to a light source included in the display device that is coupled to sequentially occurring pins of a specific driver chip included in the display device, wherein the specific driver chip resides within a chain of driver chips that is coupled to a specific serial peripheral interface included in the display device.

16. The non-transitory computer-readable medium of claim 11, wherein the topology includes a plurality of rows corresponding to a plurality of rows of light sources included in the display device and a plurality of columns corresponding to a plurality of columns of light sources included in the display device, and wherein the step of determining the first portion of the topology comprises automatically mapping the first vertical scan position to a first row included in the plurality of rows included in the topology.

17. The non-transitory computer-readable medium of claim 11, wherein the first set of instructions comprises a burst transaction that is executed by a first serial peripheral interface included in the display device during a single clock cycle.

18. The non-transitory computer-readable medium of claim 11, further comprising the step of generating one or more additional instructions based on a second subset of the wiring configurations, wherein the display device executes the one or more additional instructions upon reaching the second vertical scan position to update a second subset of the light sources, thereby displaying at least another portion of the image.

19. The non-transitory computer-readable medium of claim 18, wherein the second subset of the wiring configurations is generated by:
- determining a second serial peripheral interface included in the display device based on the second set of wiring configurations;
- determining a second chain of driver chips coupled to the second serial peripheral interface based on the second set of wiring configurations;
- determining a second driver chip included in the second chain of driver chips based on the second set of wiring configurations; and
- determining one or more additional sequentially occurring pins of the second driver chip based on the second set of wiring configurations,
- wherein the second subset of the light sources is coupled to the one or more additional sequentially occurring pins, and wherein the one or more topological criteria is met by any wiring configuration that corresponds to a light source coupled to a sequentially occurring pin of a given driver chip that is included in a given chain of driver chips coupled to a given serial peripheral interface.

20. A system, comprising:
a memory storing a compiler; and
a processor that, when executing the compiler, is configured to perform the steps of:
- determining a first portion of a topology based on a first vertical scan position of the display device, wherein the first portion of the topology includes a first set of wiring configurations and indicates a first set of light sources included in the display device that are related to the first set of wiring configurations,
- determining a first subset of the wiring configurations based on one or more topological criteria associated with the display device, wherein the first subset of the wiring configurations corresponds to a first subset of the light sources, and
- generating at least one instruction based on the first subset of the wiring configurations, wherein the display device executes the at least one instruction upon reaching the first vertical scan position to update the first subset of the light sources in order to display at least a portion of an image.

* * * * *